United States Patent [19]

Kramer et al.

[11] Patent Number: 5,096,478
[45] Date of Patent: Mar. 17, 1992

[54] APPARATUS AND METHOD FOR CONVEYING GLASS SHEETS

[75] Inventors: Joseph O. Kramer, Toledo; Dexter H. McMaster, Perrysburg, both of Ohio

[73] Assignee: Glasstech, Inc., Perrysburg, Ohio

[21] Appl. No.: 675,992

[22] Filed: Mar. 26, 1991

[51] Int. Cl.⁵ .............................................. C03B 18/00
[52] U.S. Cl. ..................................... 65/25.3; 65/99.1; 65/256; 65/289
[58] Field of Search ....................... 65/182.2, 101, 100, 65/99.1, 289, 253, 258, 256, 25.2, 25.3, 273

[56] References Cited

U.S. PATENT DOCUMENTS

| | | | |
|---|---|---|---|
| 3,473,910 | 10/1969 | Wilde et al. | 65/182.2 |
| 3,607,173 | 9/1971 | McMaster et al. | 65/182.2 X |
| 4,200,446 | 4/1980 | Koontz | 65/182.2 X |
| 4,626,207 | 12/1986 | Aubry et al. | 65/289 X |
| 4,775,404 | 10/1988 | Klempner | 65/273 |
| 4,976,762 | 12/1990 | Anttonen | 65/289 X |
| 5,009,695 | 4/1991 | Kuster et al. | 65/182.2 |

Primary Examiner—Robert L. Lindsay
Attorney, Agent, or Firm—Brooks & Kushman

[57] ABSTRACT

An apparatus (10) for conveying a glass sheet (12) disclosed includes an air floatation glass sheet heating furnace (14) having a downwardly sloping heating bed (15). The furnace (14) includes an endless conveyor means (18) revolvable in situ and a plurality of restraining bars (20) supported by the conveyor means (18) and revolving with the conveyor means (18). The restraining bars (20) are movable sequentially adjacent the heating bed (15) and away from the heating bed (15) while revolving with the conveyor means (18). The restraining bars (20) are adapted to engage a leading edge of the glass sheet (12) to restrain the sheet so that the glass sheet (12) is moved along the heating bed (15) at a conveyor speed while the restraining bars (20) are moved adjacent the heating bed (15) and to slow the movement of the glass sheet (12) from the conveyor speed to a speed approaching a zero speed by a transition of the movement of the conveyor means (18) and restraining bars (20) from adjacent the heating bed (15) to away from the heating bed (15).

15 Claims, 4 Drawing Sheets

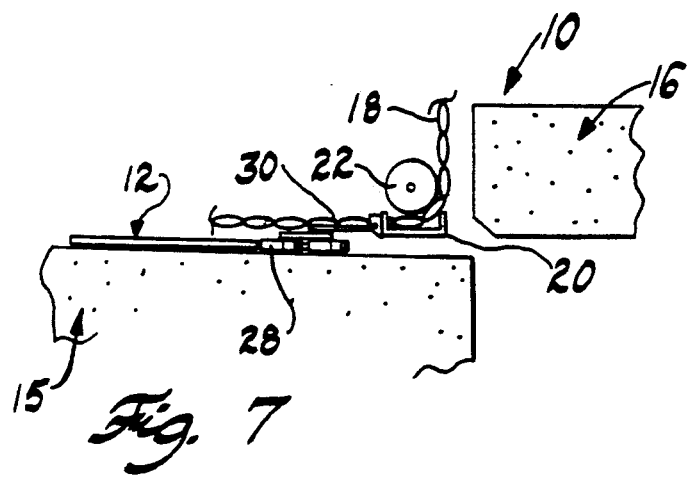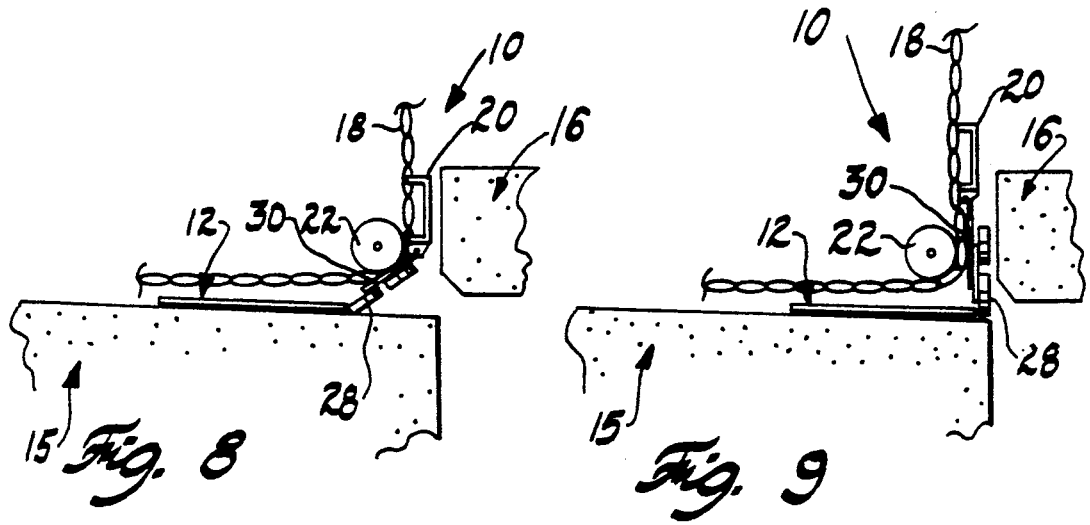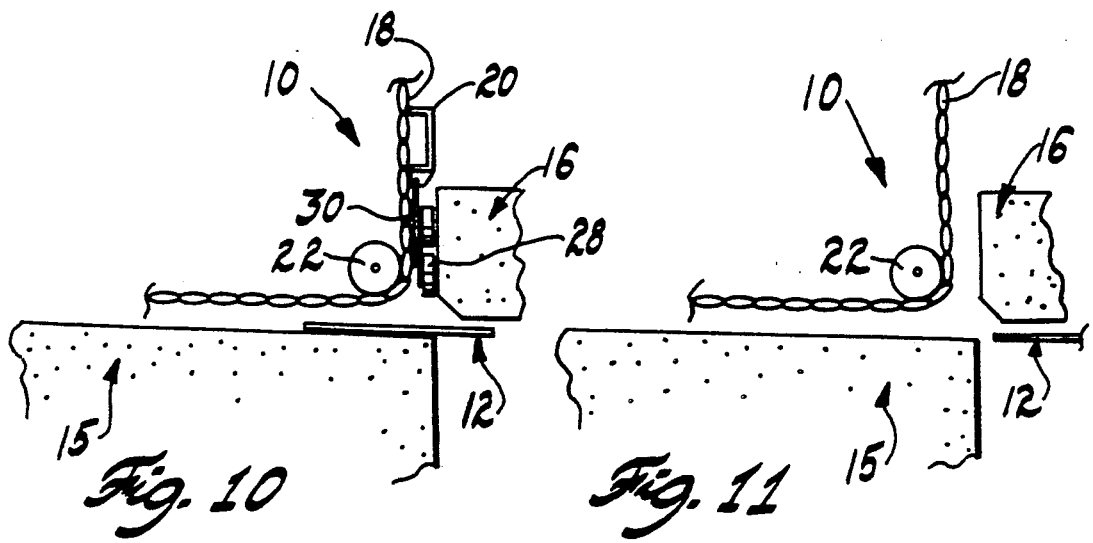

APPARATUS AND METHOD FOR CONVEYING GLASS SHEETS

TECHNICAL FIELD

This invention relates to an apparatus for conveying a glass sheet and more particularly to controllably conveying a glass sheet supported by an air cushion in a glass sheet heating furnace.

BACKGROUND ART

Conventional glass sheet processing systems for heating and forming a glass sheet include a glass sheet heating furnace and adjacent forming apparatus. Typically, a roller conveyor including a plurality of conveyor rolls is used to support and convey the glass sheet through the heating furnace in a direction of glass sheet conveyance. At the end of the furnace is a topside support means for receiving the heated glass sheet from the roller conveyor. The topside support means supports the glass sheet by vacuum pressure from above. In a next step, a mold shuttleable under the topside support means receives the glass sheet for further processing.

Alternatively, an air floatation furnace has been used for heating glass sheets. In these furnaces, hot air is used to support the glass sheet in the furnace above a heating bed that slopes upwardly in the direction of glass sheet conveyance. The hot air acts like a frictionless air bearing and the glass sheet is guided and pushed by a conveyor having pusher bars that push the glass uphill through the furnace.

In order to use such an air floatation furnace with a topside support means, it becomes necessary to get the pusher bars out of the way before the glass sheet arrives at the topside support means. The reasons are twofold; so that the pusher bars do not interfere with locating devices, such as that disclosed in U.S. patent application Ser. No. 554,373 and also so that the shuttle is movable beneath the air support means for receiving the heated glass sheet for further processing.

Furthermore, it is necessary to slow down the speed at which the glass sheet is travelling in the direction of glass sheet conveyance in order to properly position the heated glass sheet on the topside support means for further processing. Slowing down the rate of speed of the conveyed glass sheet can only be accomplished by continuously regulating the speed of the pusher bars.

SUMMARY OF THE INVENTION

An object of the present invention is to provide apparatus for conveying a glass sheet in an air floatation glass sheet heating furnace that facilitates the ability to transfer a glass sheet from a heating bed to a topside support means.

Another object of the invention is to provide apparatus for conveying a glass sheet in an air floatation glass sheet heating furnace that reduces the speed of conveyance of the glass sheet at the end of its conveyance without adjusting the speed of the apparatus.

Another object of the invention is to provide an apparatus for conveying a glass sheet in an air flotation glass sheet heating furnace that aligns the glass sheet during its conveyance.

A further object of the invention is to provide apparatus for conveying a glass sheet in an air floatation glass sheet heating furnace that does not interfere with an associated topside transfer means or other processing equipment.

A more specific object of the present invention is to provide an apparatus for conveying a glass sheet in a direction of glass sheet conveyance in a glass sheet processing system that comprises an air floatation glass sheet heating furnace having a downwardly sloping, in the direction of glass sheet conveyance, heating bed over which the glass sheet is supported and conveyed. The processing system also includes a topside support means adjacent to and downstream of the heating furnace for receiving the heated glass sheet from the heating bed.

The apparatus includes an endless conveyor means revolvable in situ and a plurality of restraining bars supported by the conveyor means. The restraining bars revolve with the conveyor means and are movable sequentially adjacent the heating bed in the direction of conveyance and away from the heating bed while revolving with the conveyor means. The restraining bars are adapted to engage a leading edge of the glass sheet to restrain the sheet so that the glass sheet is moved along the heating bed at the conveyor speed while the restraining bars are moved adjacent the heating bed. The restraining bars are configured with respect to the conveyor means and their support to slow the movement of the glass sheet from the conveyor speed to a speed approaching a zero speed, by the transition of the movement of the conveyor means and restraining bars from adjacent the heating bed to away from the heating bed so that when the glass sheet is released, it is released at a zero speed.

The apparatus further includes a guide over which the conveyor means makes the transition from movement adjacent the heating bed to movement away from the heating bed.

In the preferred embodiment of the invention, the endless conveyor means is a chain conveyor comprised of two endless chains. The guide that guides the chain conveyor during its transition from movement adjacent to movement away from the heating bed is a sprocket.

The restraining bars extend between the two chains and are adjustably connected so that spacing between the bars can be adjusted. Each bar includes a branch having a plurality of nesting pads. Preferably, the nesting pads are rotatable discs and each branch is pivotally mounted to the restraining bars. The nesting pads engage the leading edge of the glass sheet and restrain it from its downstream movement which is effected by gravity. Preferably, the restraining bars include two spaced opposed branches on either side of the center line of the heating bed. These branches are adjustably mounted so that they can be easily positioned along a respective bar to accommodate glass sheets of different sizes. Each branch therein includes a pivotal member having a pivotal axis. The pivotal members each mount two discs having centers for rotation which position the glass sheet as the glass sheet is conveyed along the heating bed.

The above objects and other objects, features, and advantages of the present invention are readily apparent from the following detailed description of the best mode for carrying out the invention when taken in connection with the accompanying drawings.

BRIEF DESCRIPTION OF THE DRAWINGS

FIGS. 7-11 are partial sectional elevational views of the conveyor consecutively illustrating the movement of a restraining bar and action of a branch and nesting pad.

BEST MODE FOR CARRYING OUT THE INVENTION

Figure 1:
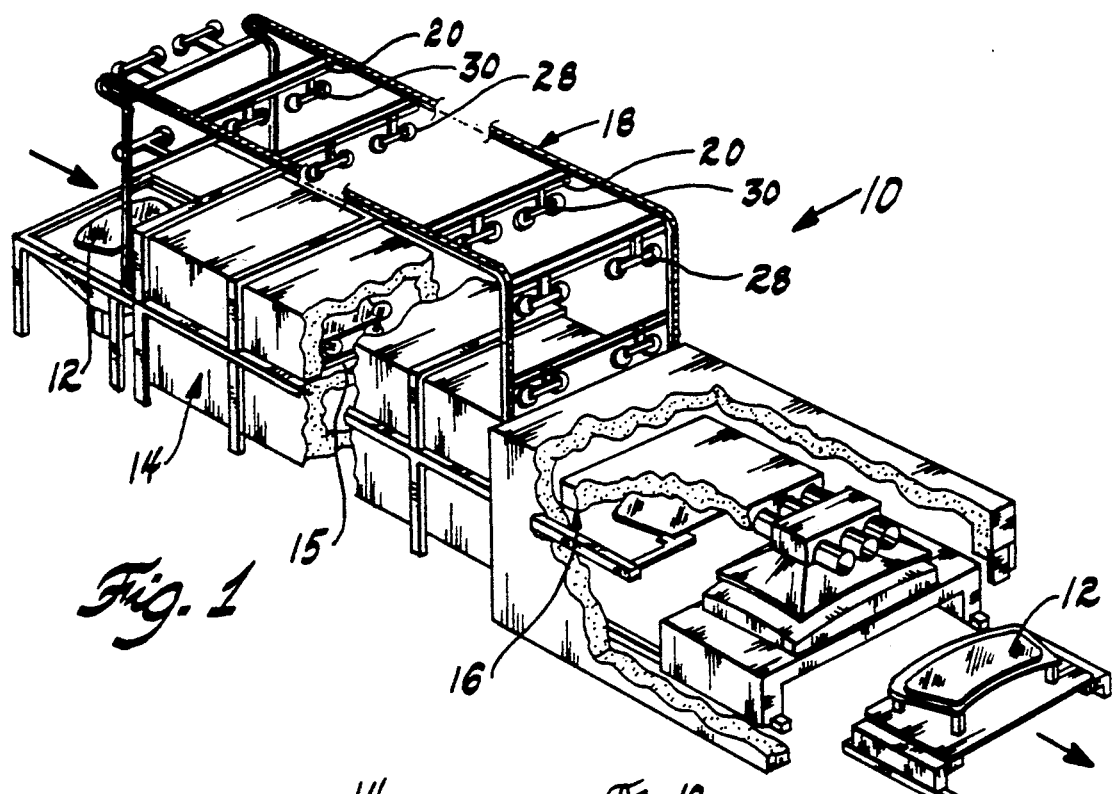
FIG. 1 is a perspective, partially cut-away view of an air floatation glass sheet heating furnace and glass sheet processing system illustrating apparatus for conveying a glass sheet constructed in accordance with the present invention.
Figure 2:
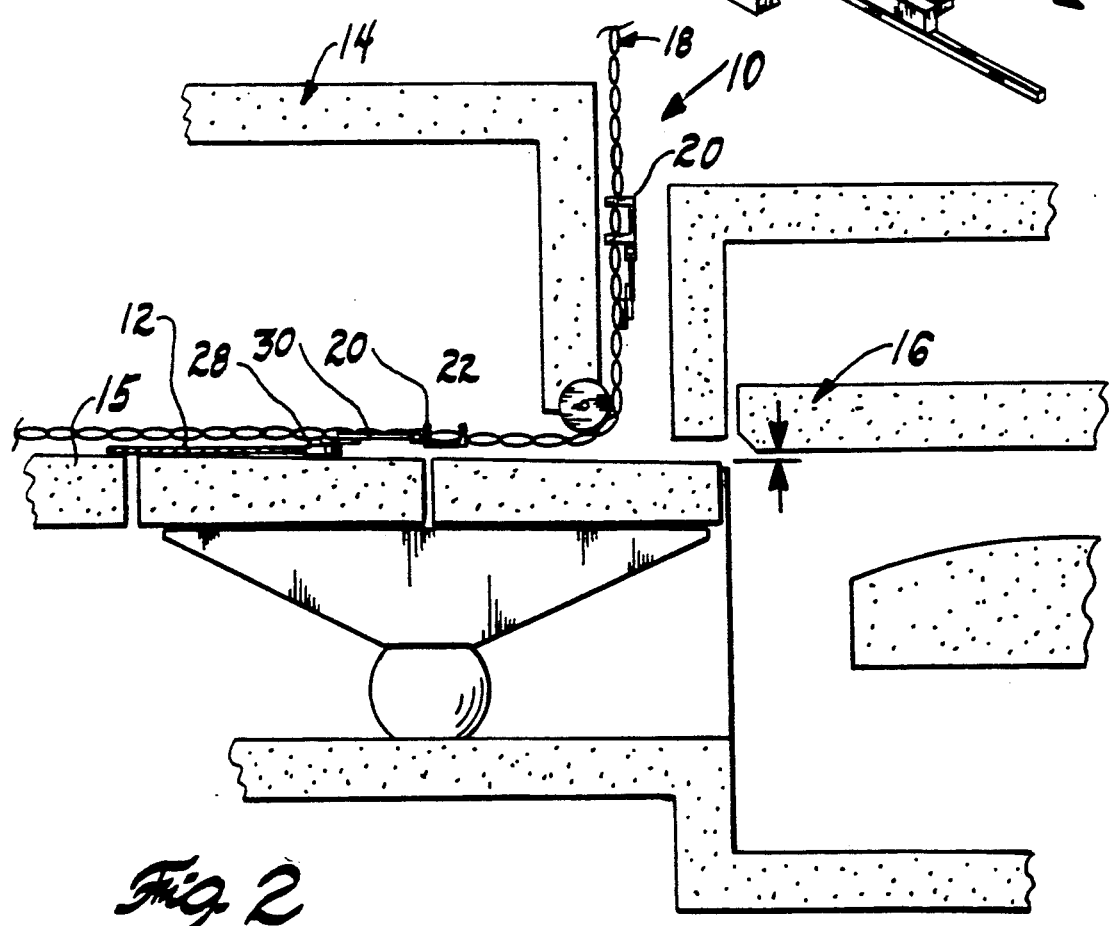
FIG. 2 is a partial sectional elevational view of the furnace, processing system and conveyor of FIG. 1.

Referring to FIG. 1 of the drawings, an apparatus for conveying a glass sheet constructed in accordance with the present invention is generally indicated by reference numeral 10. As is hereinafter more fully described, the conveying apparatus 10 comprises an air floatation glass sheet heating furnace 14 having a downwardly sloping heating bed 15 to convey by gravity, the glass sheet supported on an air cushion. The downwardly sloping heating bed 15 facilitates the transfer of the glass sheet 12 to a topside support means 16 adjacent to and downstream of the heating furnace 14. The apparatus 10 also has the ability to decrease the speed of the conveyed glass sheet from its conveyance speed to a zero speed prior to the release of the glass sheet 12 from the heating bed 15 to further facilitate the transfer of the glass sheet 12 to the topside support means 16.

As shown in FIG. 1, the conveying apparatus 10 is used for conveying a glass sheet 12 in a direction of glass sheet conveyance indicated by an arrow in the glass sheet processing system. The system includes an air floatation glass sheet heating furnace 14 having a downwardly sloping, in the direction of glass sheet conveyance, heating bed 15 over which the glass sheet 12 is supported by a air cushion and conveyed by gravity. The system also includes a topside support means 16 adjacent to and located downstream of the heating furnace 14 for receiving the heated glass sheet 12 from the heating bed 15 and for supporting the glass sheet from above by vacuum pressure.

The conveying apparatus 10 includes an endless conveyor means 18 revolvable in situ. A plurality of restraining bars 20 are supported by the conveyor means 18 and revolve with the conveyor means. The restraining bars 20 are movable sequentially adjacent the heating bed 15 in the direction of conveyance and away from the heating bed while revolving with the conveyor means 18.

The restraining bars 20 are adapted to engage a leading edge of the glass sheet 12 to restrain the sheet so that the glass sheet is moved along the heating bed 15 at the conveyor speed while the restraining bars are moving adjacent the heating bed. The restraining bars 20 are configured with respect to the conveyor means 18 and their support to slow the movement of the glass sheet 12 from the conveyor speed to a speed approaching a zero speed, by the transition of the movement of the conveyor means and restraining bars from adjacent the heating bed 15 to away from the heating bed.

With reference to FIG. 2 and 7-11 of the drawings, apparatus 10 includes a guide 22 over which the conveyor means 18 makes the transition from movement adjacent, to movement away from the heating bed 15. As illustrated in FIGS. 1 and 2 and 7-11, the endless conveyor means 18 is a dual roller chain conveyor having one roller chain located along either side of the furnace 14. The restraining bars 20 which are illustrated as channels having capped ends 24, shown in FIG. 5, extend transversely to a longitudinal axis of the furnace 14 and are connected to both chains by extended roller chain connecting pins 26. Guide 22 is a sprocket and there is one for each chain.

Figure 3:
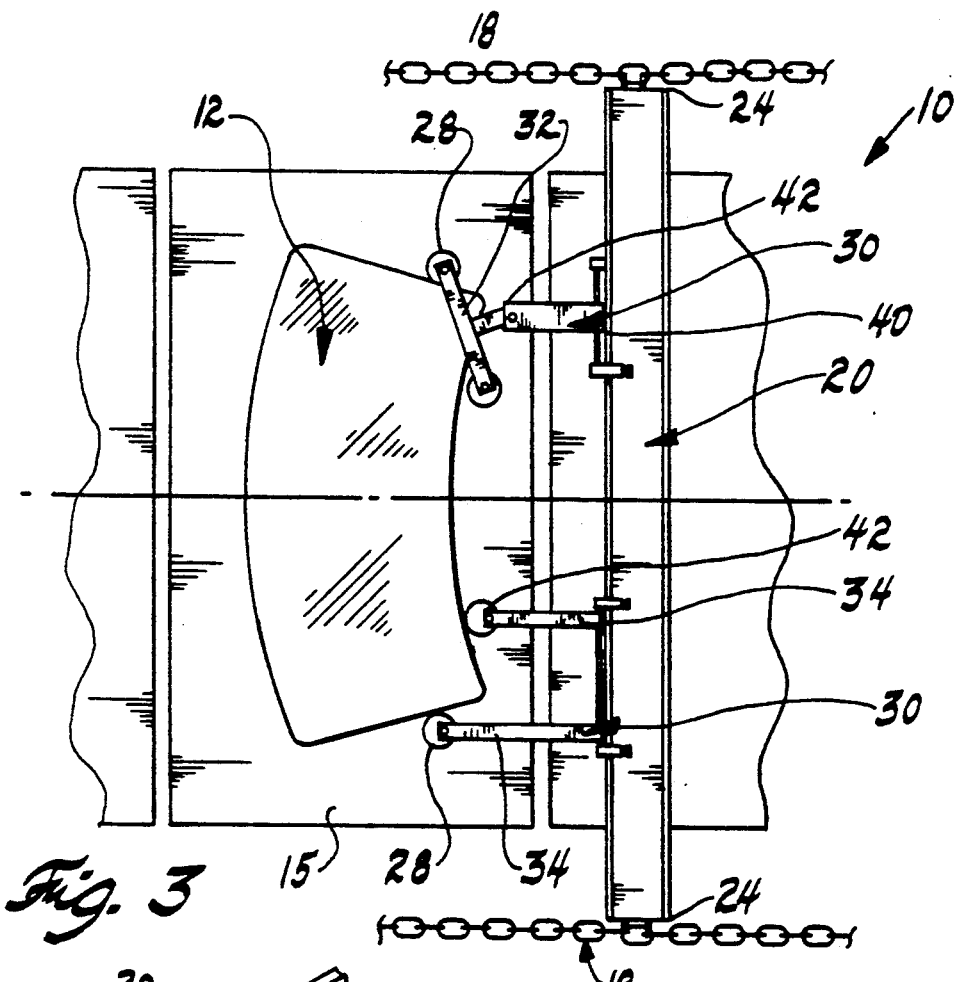
FIG. 3 is a sectional plan view of the conveyor illustrating a restraining bar including two embodiments of branches each having nesting pads for engaging and restraining gravitationally induced movement a glass sheet.
Figure 4:
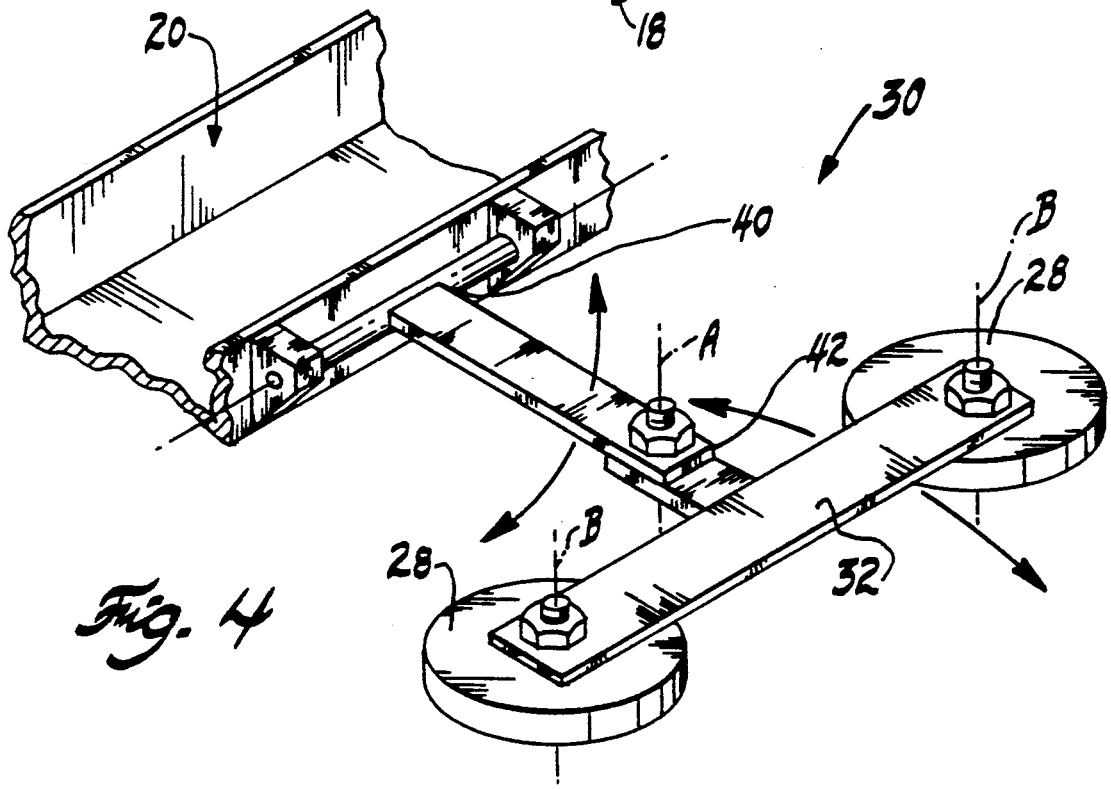
FIG. 4 is an enlarged perspective view of one embodiment of the branch of the restraining bar of FIG. 3.
Figure 5:
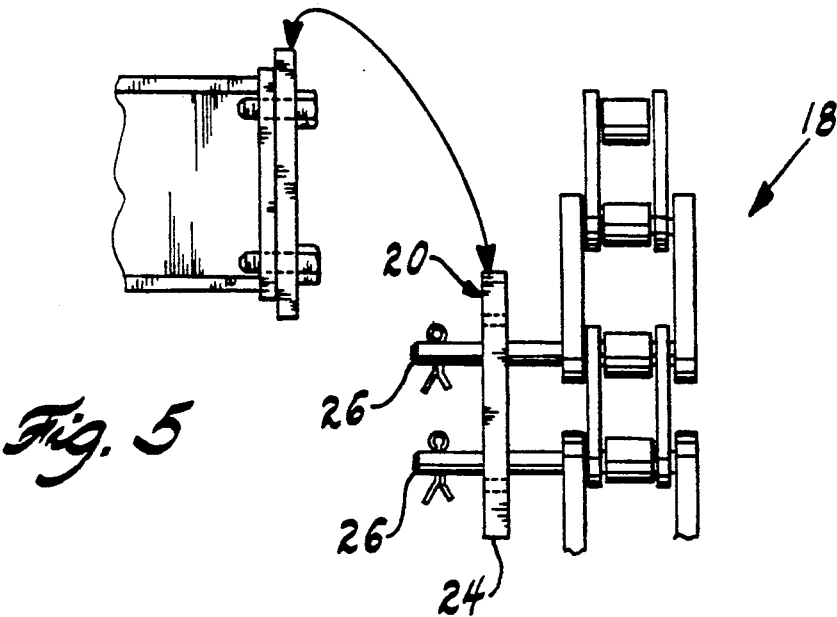
FIG. 5 is an enlarged view of a section of the conveyor illustrating attachment of the restraining bar.

As shown in FIGS. 3 through 5, the restraining bars 20 are of a channel shape and include two branches 30 having two nesting pads 28. FIG. 3 illustrates a restraining bar 20 having two different embodiments of branches 30 mounted thereon Each branch 30 is pivotally mounted to the restraining bar 20 for movement in a vertical plane. The nesting pads 28 engage the leading edge of the glass sheet 12 and restrain the glass sheet from its free-falling tendency to controllably move the glass sheet at a conveyor speed along the heating bed 15.

Figure 6:
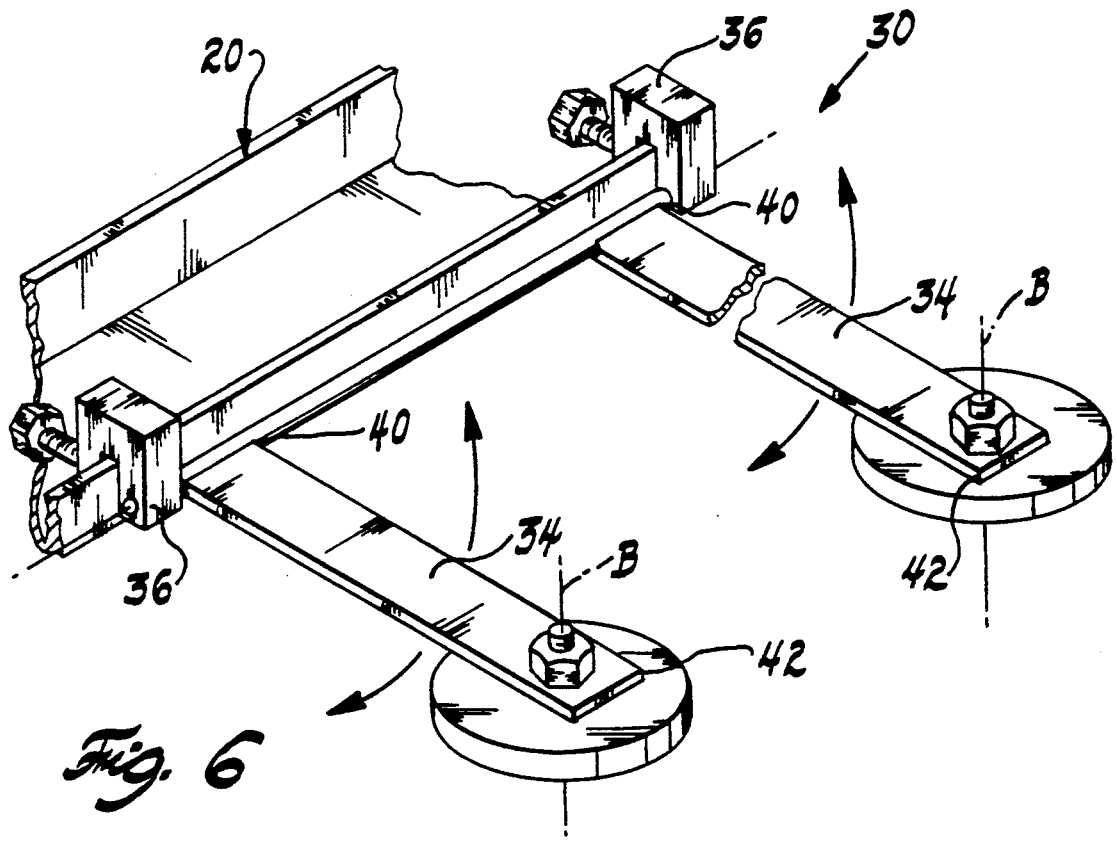
FIG. 6 is an enlarged perspective view of a second embodiment of the branch of the restraining bar of FIG. 3.

In FIGS. 4 and 6, the two embodiments of the branches 30 are shown in detail. In FIG. 4, the branch 30 includes a pivotal member 32 having a pivotal axis A. The pivotal member 32 includes two nesting pads 28 defined by discs having centers for rotation B on opposite sides of the pivotal axis A thereby for positioning the glass sheet 12 by the combined action of gravitational forces acting on the glass sheet 12, the ability of the discs to rotate and the pivotal ability of the member.

In FIG. 6, the branch 30 includes two fixed links 34 of differing lengths having nesting pads 28 mounted thereon for positioning the glass sheet 12 as herein above described. Also, branch 30 is illustrated as including a clamp 36 for mounting the branch to the restraining bar 20. Such a clamp 36 can also be used with the branch 30 embodiment illustrated in FIG. 4. The clamp 36 feature allows the branch 30 to be adjustably mounted on the restraining bar 20 so that differently sized glass sheets 12 can be accommodated.

OPERATION OF THE INVENTION

FIGS. 7-11 illustrate through consecutive illustrations the operation of the conveying apparatus 10 and show how the glass sheet 12 is brought from the conveyor speed to a zero speed as the restraining bars 20 move adjacent the heating bed 15 to away from the heating bed.

In FIG. 7, the glass sheet 12 is supported by an air cushion over the downwardly sloping heating bed 15 of air floatation furnace 14. The nesting pads 28 of the restraining bar 20 restrain the glass sheet 12 from its free-falling tendency and move the glass sheet along at the conveyor speed as the restraining bar moves adjacent the heating bed 15 in a direction of conveyance.

In FIG. 8, the restraining bar 20 makes a transition from movement adjacent the heating bed 15 to movement away from the heating bed as the restraining bar passes over the guide 22. As the restraining bar 20 begins its movement away from the heating bed 15, the branch 30, which is pivotally mounted to the restraining bar, follows. As the branch follows, the pivotal end 40 of the branch 30 is maintained at the conveyor speed while the distal end 42 of the branch where the nesting pads or discs 28 are connected is slowed during the transition from the movement adjacent the heating bed 15 to movement away from the heating bed.

FIG. 9 illustrates the glass sheet 12 being brought to an at rest position or zero speed rate at the point when the distal end 42 of the branch 30 first assumes a vertical position during the movement of the restraining bar 20 away from the heating bed 15.

FIG. 10 illustrates the continued movement of the restraining bar 20 away from the heating bed 15 and the release of the glass sheet 12 from its restrained status. When the glass sheet 12 is released, the downwardly sloping configuration of the heating bed 15 allows the glass sheet 12 to accelerate under the force of gravity. This acceleration allows the glass sheet 12 to be released from the heating bed 15 where it is then supported from above through vacuum and pressure supplied by the topside support means 16 as illustrated in FIG. 11.

While the best mode for carrying out the invention has been described in detail, those familiar with the art to which this invention relates will recognize various alternative designs and embodiments for practicing the invention as defined by the following claims.

What is claimed is:

1. Apparatus for conveying a glass sheet in a direction of glass sheet conveyance in a glass sheet processing system, the system comprising:
    an air floatation glass sheet heating furnace having a downwardly sloping, in the direction of conveyance, heating bed over which the glass sheet is supported and conveyed;
    a topside support means adjacent to and downstream of the heating bed for receiving the heated glass sheet;
    an endless conveyor means revolvable in situ; and
    a plurality of restraining bars supported by said conveyor means and revolving with said conveyor means; said restraining bars being movable sequentially adjacent the heating bed in the direction of conveyance and away from said heating bed while revolving with said conveyor means; said restraining bars being adapted to engage a leading edge of the glass sheet to restrain the sheet so that the glass sheet is moved along the heating bed at the conveyor speed while the restraining bars are moving adjacent the heating bed; said restraining bars being configured with respect to said conveyor means and their support thereby to slow the movement of the glass sheet from the conveyor speed to a speed approaching a zero speed, by the transition of the movement of said conveyor means and restraining bars from adjacent said heating bed to away from said heating bed.

2. Apparatus as in claim 1 further including a guide over which said conveyor means makes the transition from movement adjacent to movement away from said heating bed.

3. Apparatus as in claim 2 wherein said endless conveyor means is a chain conveyor.

4. Apparatus as in claim 3 wherein said chain conveyor comprises two endless roller chains.

5. Apparatus as in claim 3 wherein said guide is a sprocket.

6. Apparatus as in claim 4 wherein said restraining bars are mounted to and extend between said two endless chains.

7. Apparatus as in claim 6 wherein said restraining bars are adjustably mounted to said chains to adjust spacing between said bars.

8. Apparatus as in claim 7 wherein said restraining bars include a branch having a plurality of nesting pads; said branch being pivotally mounted to said restraining bars; said nesting pads engaging the leading edge of the glass sheet.

9. Apparatus as in claim 8 wherein said nesting pads are rotatable discs.

10. Apparatus as in claim 9 wherein said restraining bars include two spaced opposed branches.

11. Apparatus as in claim 10 wherein said spaced opposed branches are adjustably mounted to said restraining bars.

12. Apparatus as in claim wherein each branch includes a pivotal member having a pivotal axis; said member including two discs having their centers for rotation on opposite sides of the pivotal axis thereby for positioning the glass sheet.

13. A method of conveying a glass sheet in an air floatation glass sheet heating furnace having a downwardly sloping glass sheet heating bed and an endless conveyor means revolvable in situ, comprising:
    restraining the movement of the glass sheet from its free falling tendency to move the glass sheet at a conveyor speed adjacent the heating bed; and
    decelerating the glass sheet from the conveyor speed to a speed approaching a zero speed as the endless conveyor makes a transition from movement adjacent the heating bed to movement away from the heating bed.

14. The method of claim 13 including stopping the movement of the glass sheet at the end of the heating conveyor while continuing to revolve the conveyor means at the conveyor speed.

15. The method of claim 14 including releasing the glass sheet after the stopping.

* * * * *

UNITED STATES PATENT AND TRADEMARK OFFICE
CERTIFICATE OF CORRECTION

PATENT NO. : 5,096,478

DATED : March 17, 1992

INVENTOR(S) : Joseph O. Kramer and Dexter H. McMaster

It is certified that error appears in the above-identified patent and that said Letters Patent is hereby corrected as shown below:

Column 6, line 31, after "claim" insert -- 11 --.

Signed and Sealed this

Fourth Day of May, 1993

Attest:

MICHAEL K. KIRK

Attesting Officer

Acting Commissioner of Patents and Trademarks